(12) United States Patent
Chen (10) Patent No.: US 7,010,268 B2
(45) Date of Patent: Mar. 7, 2006

(54) FAR END REMOTE CONTROL METHOD AND SYSTEM BY SHORT MESSAGE AND BLUETOOTH FUNCTION OPERATION

(75) Inventor: James Chen, Hsinchu (TW)

(73) Assignee: Lite-On Technology Corp., Taoyuan Hsien (TW)

( * ) Notice: Subject to any disclaimer, the term of this patent is extended or adjusted under 35 U.S.C. 154(b) by 413 days.

(21) Appl. No.: 10/309,300

(22) Filed: Dec. 4, 2002

(65) Prior Publication Data

US 2004/0203950 A1    Oct. 14, 2004

(30) Foreign Application Priority Data

Aug. 20, 2002   (TW) ................. 91118849 A (51) Int. Cl.
*H04B 7/00*    (2006.01)
(52) U.S. Cl. ............... 455/41.2; 455/466; 455/420
(58) Field of Classification Search ............. 455/41.2, 455/466, 41.3, 422.1, 419, 420
See application file for complete search history.

(56) References Cited

U.S. PATENT DOCUMENTS

| | | | | |
|---|---|---|---|---|
| 6,754,484 B1 * | 6/2004 | Hiltunen et al. | ......... | 455/412.1 |
| 2002/0176388 A1 * | 11/2002 | Rankin et al. | ............. | 370/338 |
| 2003/0165129 A1 * | 9/2003 | Sharma et al. | ............. | 370/338 |
| 2004/0204029 A1 * | 10/2004 | Parry | ................... | 455/552.1 |

\* cited by examiner

*Primary Examiner*—Temica Beamer
(74) *Attorney, Agent, or Firm*—Bacon & Thomas, PLLC (57) ABSTRACT

A far end remote control method and system by a short message and Bluetooth function operation are used to control output/input devices at a far end. The system mainly comprises a cellular phone, controlling device and controlled devices. Here, the method comprises the following steps: first, a cellular phone transmits a short message control command to a controlling device through a cellular phone network; the controlling device searches a controlled device appointed in the command; the controlling device builds a Bluetooth Serial Port Profile connection with the controlled device after the appointed controlled device is found; the controlling device transmits the short message control command to the controlled device through the connection; the controlled device controls an output or input device after receiving the command; the controlled device transmits an execution result back to the controlling device; the controlling device reports the execution result back to the cellular phone by a short message; the controlling device disconnects the connection with the controlled device and waits for a next control command after the report is completed. Thereby, the control range can be expanded to the all places in the world that the cellular phone is applicable. And, the controlled device can built a temporary network with the controlling device, the structure will not be changed even if the number of the controlled devices is increased or decreased.

10 Claims, 8 Drawing Sheets

FAR END REMOTE CONTROL METHOD AND SYSTEM BY SHORT MESSAGE AND BLUETOOTH FUNCTION OPERATION

TECHNICAL FIELD

The present invention relates to a far end remote control method and system by short message and Bluetooth function operation, and more particularly to a method and system for a cellular phone to control controlled devices by short messages through a controlling device.

TECHNICAL BACKGROUND

A conventional far end remote control technique (such as the remote control of household appliances) needs to build a net structure in advance to do a remote control through Internet or a phone with DTMF. However, net playing facilities (such as computers) and a net itself must be prepared any time if the far end remote control is executed through Internet. The transportation of net playing facilities is difficult, and the built-in-advance net is of no mobility. And, a DTMF remote control needs a phone; it is not conformed with economic interest if transnational phone calls are made.

By the way, Ad-Hoc Network technology, which is one of Bluetooth technology, can be used to build a temporary net by a wireless host. It is helpful on mobility and convenience of the far end remote control under the situation that an organized net structure is not built in advance.

SUMMARY OF THE INVENTION

A far end remote control method and system by short message and Bluetooth function operation according to the present invention comprises a cellular phone that can transmit and receive a short message, a controlling device that can receive the short message and is furnished with Bluetooth function, and a controlled device with Bluetooth function. The controlling device receives a short message command from the cellular phone and controls the controlled device through the Bluetooth function. Besides, the controlling device can report an execution result to the cellular phone by short message.

Therefore, the main object of the present invention is to provide a far end remote control method and system by short message and Bluetooth function operation, a cellular phone, which transmits and receives short messages, can control a controlling device according to the present invention remotely by sending a short message command out, and a controlled device through Bluetooth function. Here, the remote control range can reach any place in the world that the cellular phone is suitable for use.

Another object of the present invention is to provide a far end remote control method and system by short message and Bluetooth function operation, a controlling device and controlled device has Ad-Hoc characteristics of Bluetooth function to build a temporary net between them without needs to built an organized net structure in advance so that increasing or decreasing controlled devices does not influence the net structure.

Still another object of the present invention is to provide a far end remote control method and system by short message and Bluetooth function operation, a remote control processed by a short message can save phone bill cost.

DETAILED DESCRIPTION OF THE PRESENT INVENTION

Figure 1:
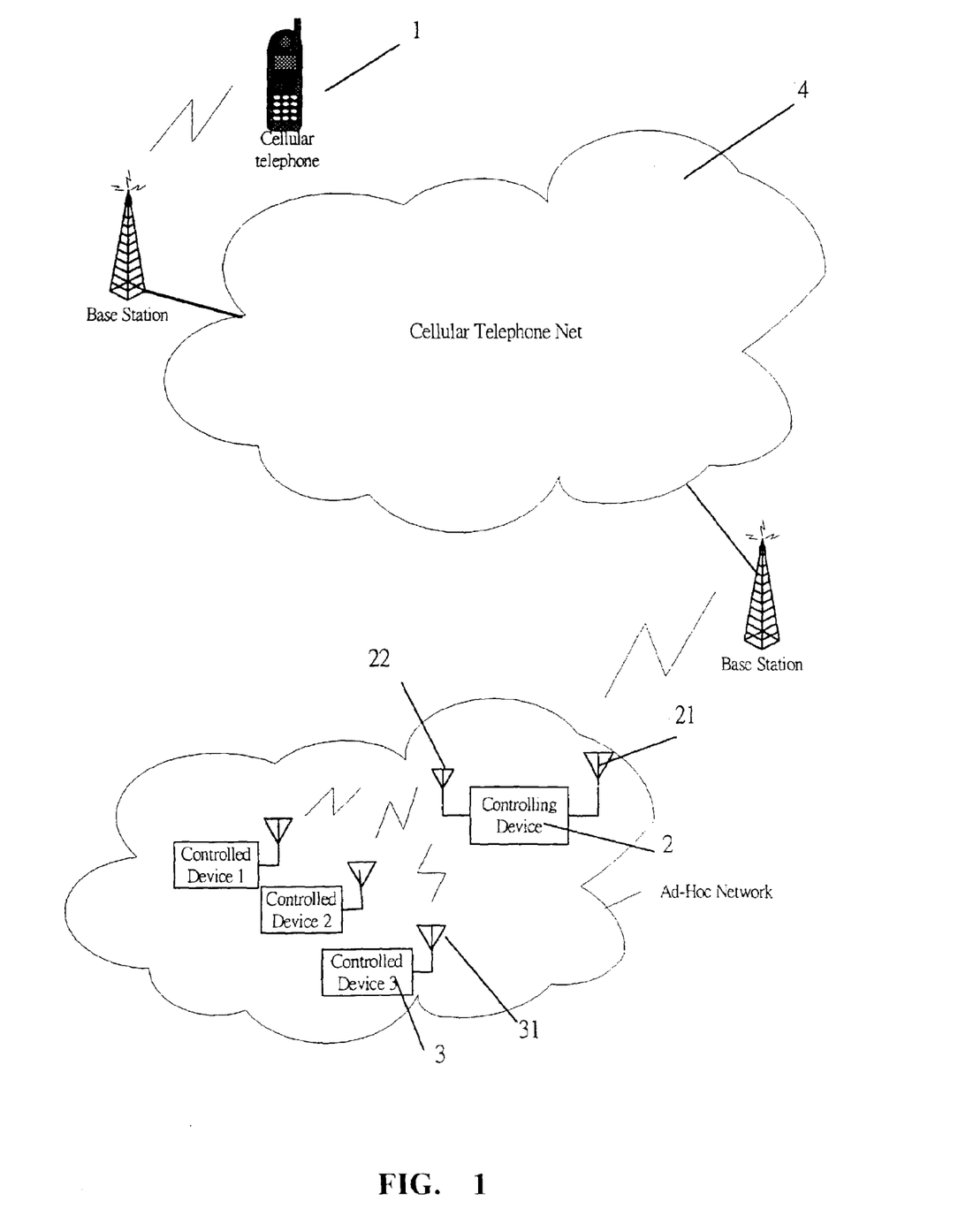
FIG. 1 is a schematic view, showing a structure of a far end remote control system operated through short message and Bluetooth function according to a preferred embodiment of the present invention.

First, please refer to FIG. 1, which shows a far end remote control system by short message and Bluetooth function operation according to a preferred embodiment of the present invention. A cellular phone 1 transmits a short message control command to a controlling device 2 with an antenna 21 used to receive the message through a cellular phone net 4. The controlling device uses a Bluetooth antenna 22 installed thereon to search a controlled device 3 with a Bluetooth antenna 31 appointed in the command. The controlling device 2 soon builds a Bluetooth Serial Port Profile connection with the controlled device 3 after the controlled device 3 is found. And then, the controlling device sends the short message control command to the controlled device 3 through this connection. An execution result is transmitted back to the controlling device 2 after the controlled device 3 controls an output/input device (not shown in the figure), and consequently, the controlling device reports the execution result to the cellular phone 1 by short message. The controlling device 2 disconnects the connection with the controlled device 3 after reporting the short message and waits for a next short message command.

Figure 2:
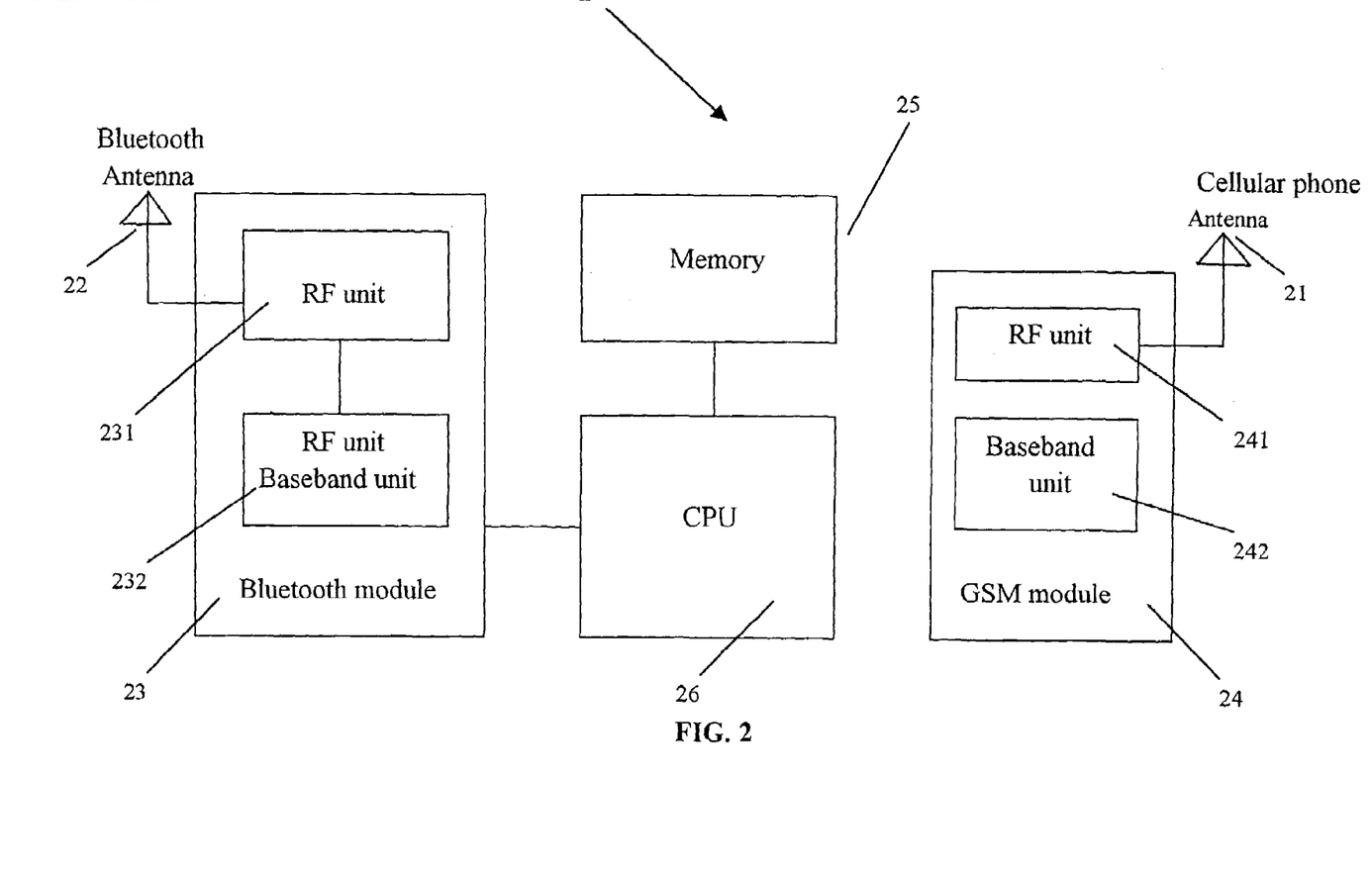
FIG. 2 is a block diagram, showing a circuit of a controlling device that can receive a short message command and is provided with Bluetooth function according to a preferred embodiment of the present invention.
Figure 3:
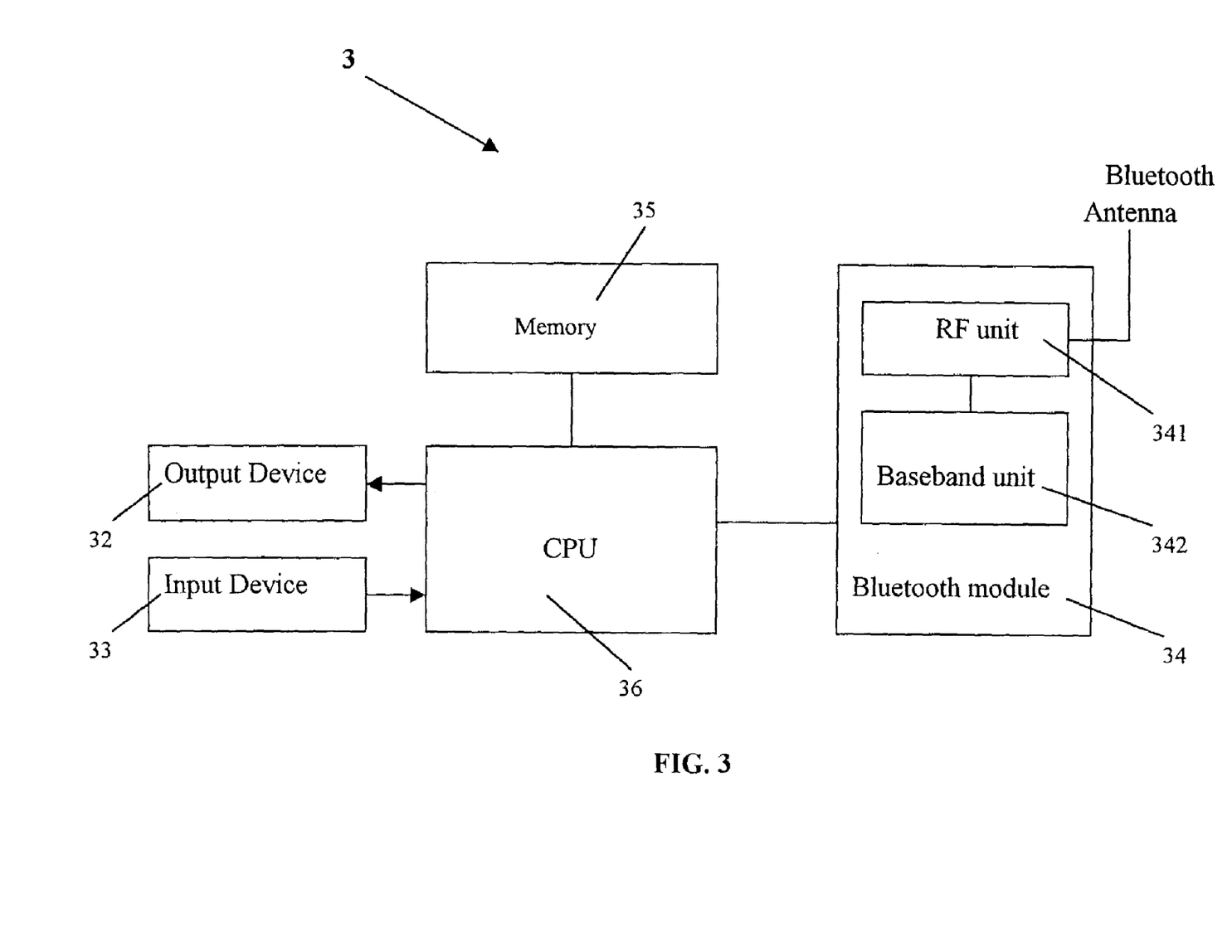
FIG. 3 is a flow chart, showing a circuit of a controlled device with Bluetooth function according to a preferred embodiment of the present invention.

Next, please refer to FIG. 2, which shows a controlling device that can receive a short message command and is provided with Bluetooth function. The controlling device 2 mainly comprises a Bluetooth module 23, cellular phone module 24, memory 25 and CPU 26. Furthermore, the cellular phone module 24 still comprises a RF unit 241, baseband unit 242 and antenna 21. And, the Bluetooth module 23 further comprises a RF unit 231, baseband unit 232 and Bluetooth antenna 22. The elements described above are well known to persons skilled in the art, the detailed description is omitted here. The controlling device 2 transmits Bluetooth addresses of all controlled devices 3 in the range of Bluetooth Ad-Hoc Network built by the controlling device 2 through the Bluetooth module 23 to the cellular phone 1, if the cellular phone antenna 21 of the cellular phone module 24 receives the short message command emitted from the cellular phone 1 to inquire about the controlled device 3. The controlling device 2 searches the appointed controlled device 3 in a short message control command when it receives the command emitted from the cellular phone 1, and then, it build a connection of Serial Port Profile with the appointed controlled device through the Bluetooth module 23 after the appointed controlled device is found out. Meanwhile, the short message command is sent to the controlled device 3 through this connection to be executed by the controlled device 3. The controlling device 2 is also responsible for reporting an execution result of the controlled device 3 to the cellular phone 1 by short message after the controlled device 3 executes the command. Thereafter, the controlling device 2 disconnects the connection between it and the controlled device immediately waits for a next short message command. Besides, the controlled device 3 may actively request the controlling device 2 to build a connection between them so as to send a particular message (such as alarm message) from the controlled device 3 to the cellular phone 1. Thereby, the controlling device can attain bidirectional transmission effect.

Figure 4:
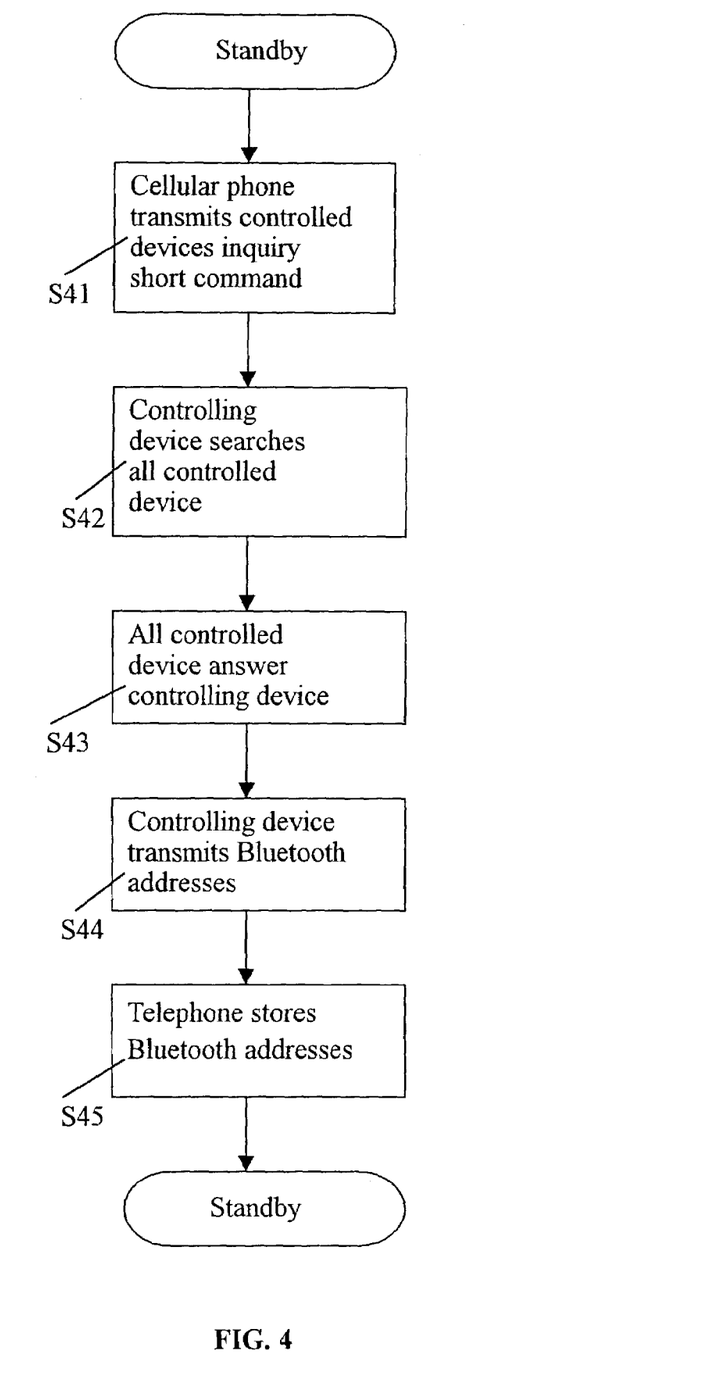
FIG. 4 is a flow chart, showing an operation procedure for a cellular phone to inquire the Bluetooth address of a controlled device according to a preferred embodiment of the present invention.
Figure 4A:
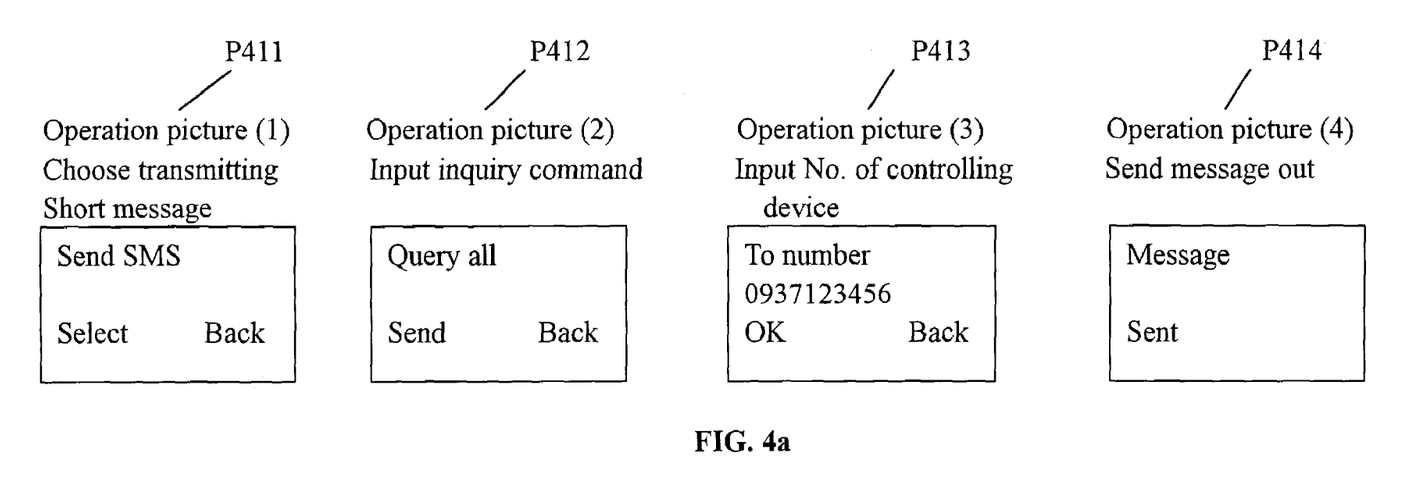
FIGS. 4a and 4b are pictures displayed on a cellular phone, corresponding to steps S41 and S45 in FIG. 4.
Figure 4B:
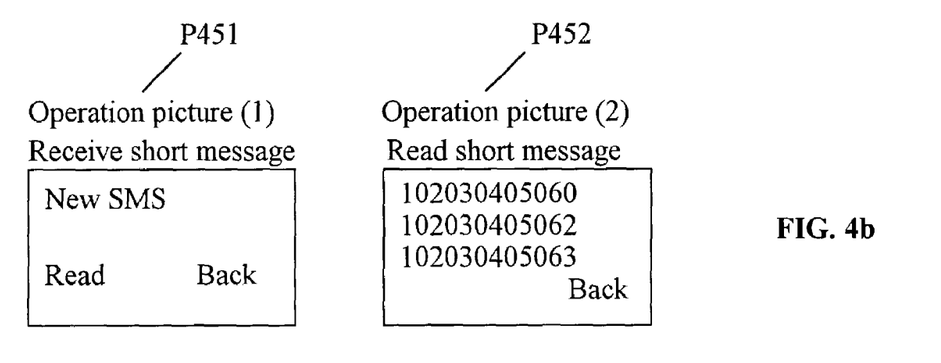

Next, the operation process for the cellular phone to inquire the Bluetooth addresses of the controlled devices is shown in FIG. 4. First, the system is in a standby state; the cellular phone sends a short message command for inquiring the controlled devices to the controlling device (step S41). At this point, a user can process the transmission by the follow four pictures shown on the screen of the cellular phone: a picture P411 for choosing whether a short message is sent, a next picture P412 for inputting an inquiry command, a next picture P413 for inputting the number of the controlling device and the last picture P414 for sending the short message out (shown in FIG. 4a). Next, the controlling device searches all controlled devices in the present Bluetooth Ad-Hoc Network (step S42). All the controlled devices answer and provide their Bluetooth addresses to the controlling device (step S43). The controlling device receives all the Bluetooth addresses of the controlled devices and transfers them to the cellular phone (step S44). The cellular phone stores the Bluetooth addresses of the controlled devices in the memory after it receives them from the controlling device (step S45). To step S45, the pictures on the screen of the cellular phone may be shown as the following: the first picture P451 for showing the short message is received and the second picture P452 for showing the addresses of the controlled deice after the message is read (shown in FIG. 4b).

Figure 5:
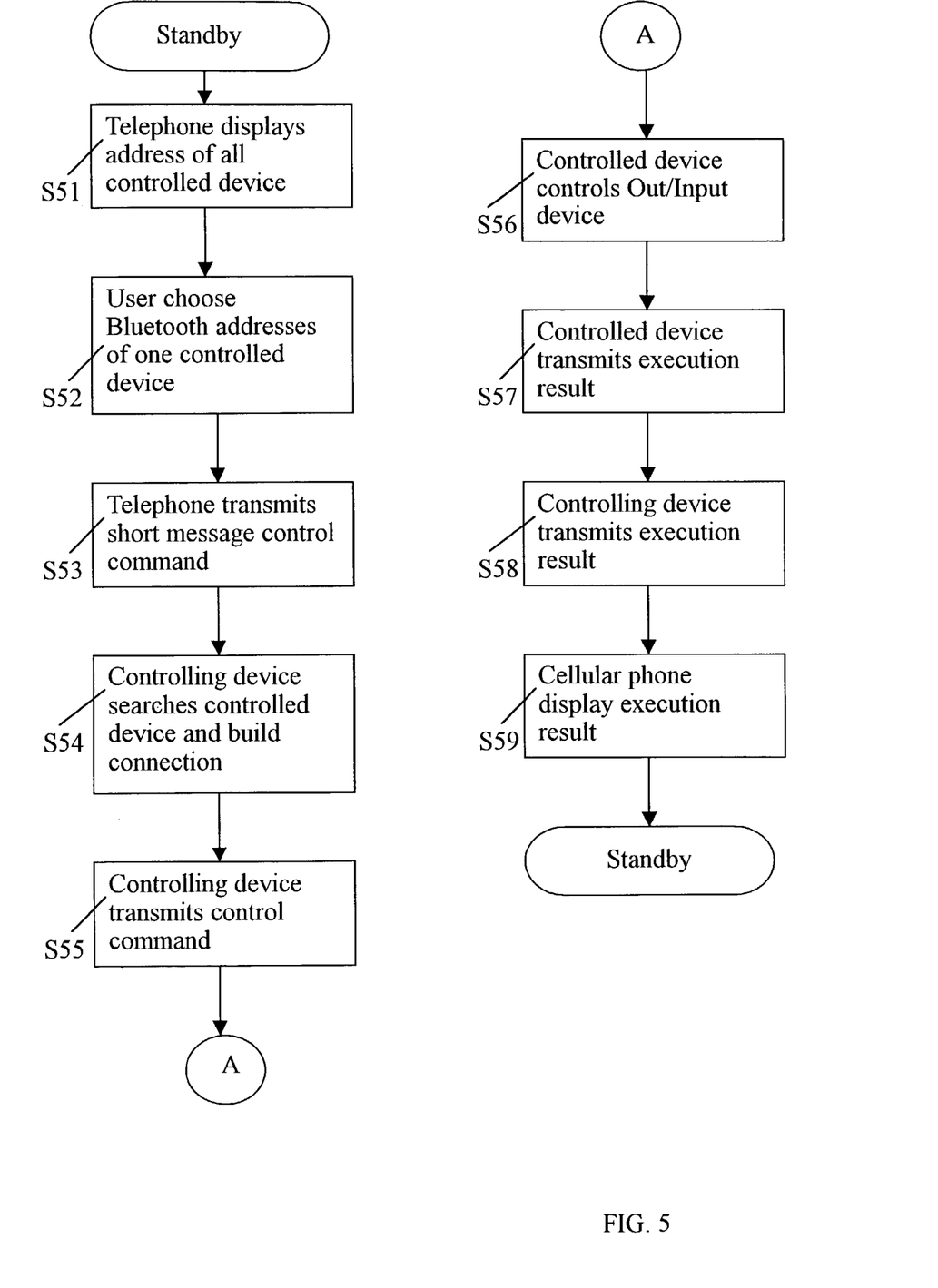
FIG. 5 is a flow chart, showing an operation procedure for a cellular phone to control a controlled device remotely by short message control command according to a preferred embodiment of the present invention.
Figure 5A:
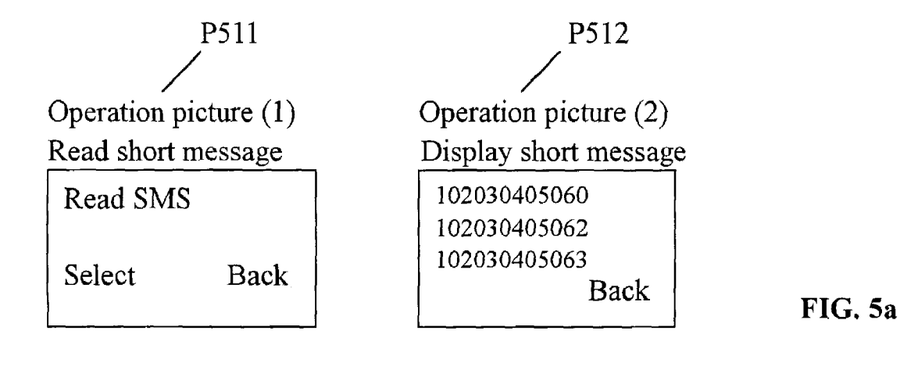
FIGS. 5a, 5b and 5c are pictures displayed on a cellular phone, corresponding to steps S51, S53 and S59 in FIG. 5.
Figure 5B:
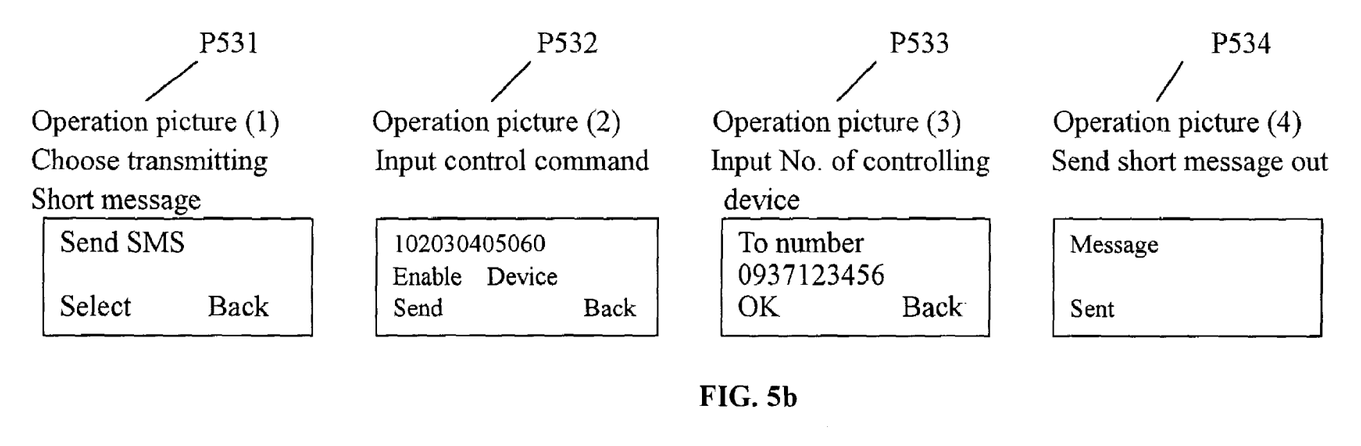
Figure 5C:
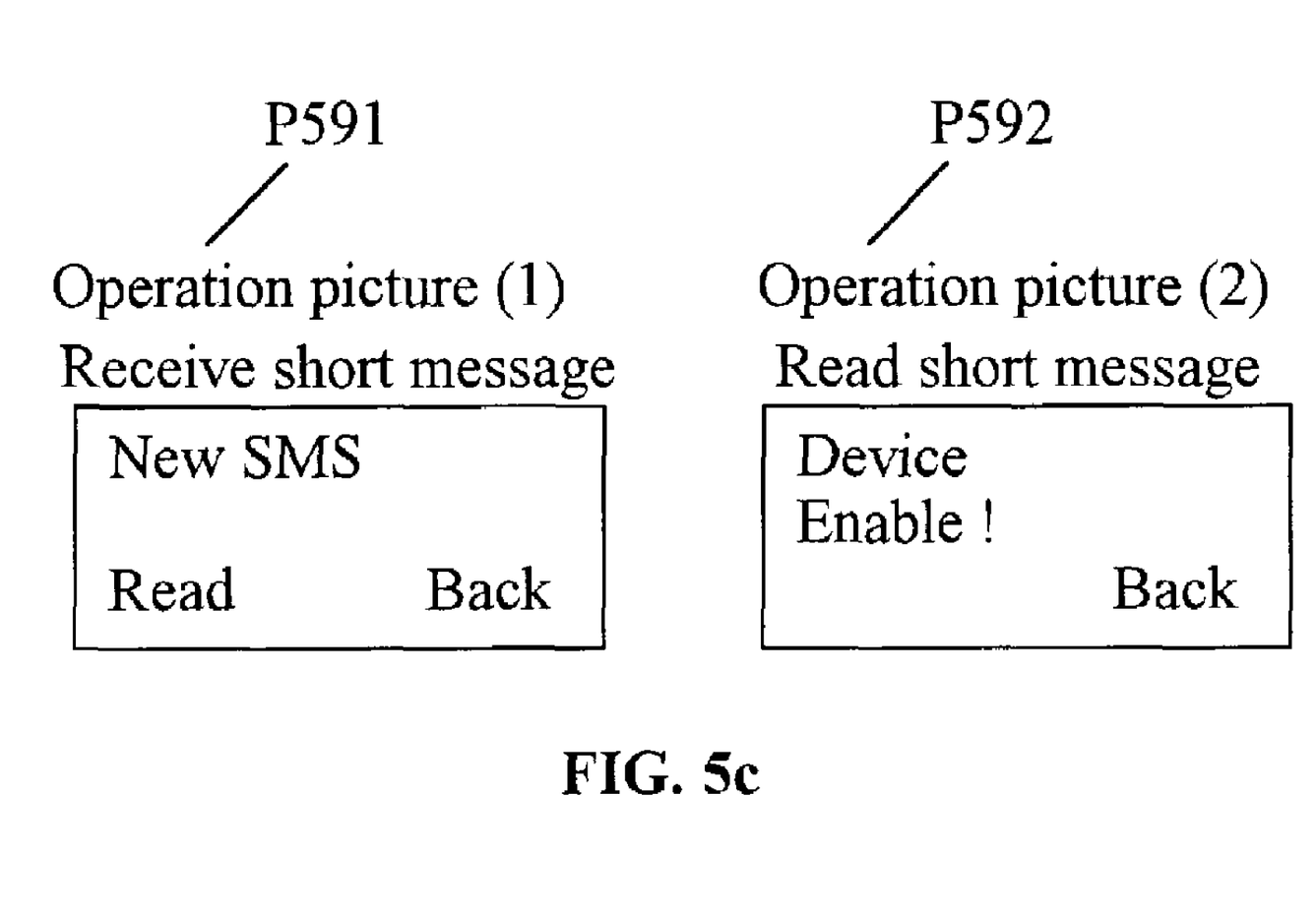

Finally, please refer to FIG. 5, which shows the operation procedure for the cellular phone to control the controlled device by a short message control command. First, the system is at a standby state, a user displays all Bluetooth addresses of controlled devices from the cellular phone (Step S5); the operation pictures shown on the cellular phone at present is a picture P511 for reading a short message and a picture P512 for showing the short message (shown in FIG. 5a), and then, the cellular phone chooses the Bluetooth address of a controlled device after the SMS is shown (step S52). Thereafter, the cellular phone transmits a set of short message controlled command to the controlling device to control the controlled device of this Bluetooth address (step S53); at this time, the pictures of the cellular phone are shown as follows: a picture P531 for showing the short message chosen to transmit, a picture P532 for showing inputting a control command, such as the Bluetooth address of the controlled device and the contents of the command (for example, 102030405060 and "Enable Device" in the picture), a picture P533 for inputting the number of the controlling device and a last picture P534 for sending the short message out (shown in FIG. 5b). The controlling device searches the appointed controlled device and builds a connection of Serial Port Profile between them after the controlled device is found (step S54). Thereafter, the controlling device transmits the control command to the controlled device through this connection (step S55). Next, the controlled device processes a control on an output/input device connected therewith after it receives the command (step S56). The controlled device transmits an execution result back to the controlling device by short message after it completes the control on the output/input device (step S57), and then, the controlling device further reports the execution result to the cellular phone by short message (step S58). And finally, the cellular phone displays the execution result (step S59). At step S59, pictures shown on the screen of the cellular phone can be shown as follows: first picture P591 for displaying that a new message is received and the second picture P592 for showing the contents of the message to confirm the execution result of the controlled device (shown in FIG. 5c).

The present invention provides a method and system to control a controlled device by a short message and Bluetooth function; a remote control range can be as far as possible. And, adding and reducing the controlled devices does not influence a net structure, because it is built only temporarily between the controlling device and the controlled device.

Although the foregoing invention has been described in some detail by way of illustration and examples for purposes of clarity and understanding, it will be readily apparent to those of skill in the art in light of the teachings of this invention that changes and modification may be made thereto without departing from the spirit of scope of the appended claims.

What is claimed is:

1. A far end remote control method by short message and Bluetooth function operation, mainly comprising the following steps:
   (1) a cellular phone transmitting a short message control command to a controlling device through a cellular phone net;
   (2) said controlling device searching a controlled device appointed in said command;
   (3) said controlling device building a Bluetooth Serial Port Profile connection with said controlled device after said controlled device is found;
   (4) said controlling device sending said command to said controlled device through said connection;
   (5) said controlled device controlling an output/input device after it receives said command;
   (6) said controlled device transmitting an execution result back to said controlling device;
   (7) said controlling device reporting said execution result back to said cellular phone;
   (8) said controlling device disconnecting said connection with said controlled device after said reporting action is done; and
   (9) said controlling device waiting for a next short message command.

2. The method of claim 1, wherein said cellular phone can process the following two steps before said step (1):
   (1') said cellular phone lists said Bluetooth address of every said controlled device; and
   (1") a user chooses a Bluetooth address from said cellular phone.

3. A far end remote control system by short message and Bluetooth function operation, mainly comprising:
  a cellular phone, which can transmit and receive a short message, responsible for transmitting short message command to a controlling device and receiving a short message execution result sent from said controlling device;
  said controlling device, which can receive a short message command and is provided with Bluetooth function, mainly comprising a cellular phone module, Bluetooth module, memory and CPU, responsible for receiving said controlled devices inquiry and control short message commands, transmitting said short message commands to said controlled devices and reporting said execution results of said controlled devices by short messages back to said cellular phone;
  a plurality of said controlled devices with Bluetooth function, mainly comprising a Bluetooth module, memory, CPU and input/output device, responsible for building a connection with said controlling device, receiving said short message control command coming from said controlling device and transmitting said execution result back to said controlling device.

4. The system of claim 3, wherein said controlling device transmits the Bluetooth addresses of all said controlled devices in a present Ad-Hoc Network to said cellular phone when said controlling device receives a controlled devices inquiry short message command.

5. The system of claim 3, wherein said controlling device searches a controlled device appointed in said command when receives said short message control command from said cellular phone.

6. The system of claim 5, wherein said controlling device builds a Bluetooth Serial Port Profile connection with said found controlled device, and transmits said short message command to said controlled device to be executed through said connection.

7. The system of claim 6, wherein said controlled device reports an execution result back to said controlling device.

8. The system of claim 7, wherein said controlling device transmits said execution result back to said cellular phone by short message.

9. The system of claim 3, wherein said controlled device can actively ask said controlling device to build a Bluetooth Serial Port Profile connection between them so as to transmit a particular message to said cellular phone.

10. The system of claim 9, wherein said particular message includes an alarm message.

* * * * *